US011963135B2

(12) United States Patent
Yasukawa et al.

(10) Patent No.: US 11,963,135 B2
(45) Date of Patent: Apr. 16, 2024

(54) USER EQUIPMENT, BASE STATION, AND METHOD OF TRANSMITTING A SCHEDULING REQUEST

(71) Applicant: NTT DOCOMO, INC., Tokyo (JP)

(72) Inventors: Shinpei Yasukawa, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/335,440

(22) PCT Filed: Sep. 28, 2017

(86) PCT No.: PCT/JP2017/035196
§ 371 (c)(1),
(2) Date: Mar. 21, 2019

(87) PCT Pub. No.: WO2018/062377
PCT Pub. Date: Apr. 5, 2018

(65) Prior Publication Data
US 2020/0022112 A1   Jan. 16, 2020

(30) Foreign Application Priority Data
Sep. 29, 2016 (JP) ................. 2016-192359

(51) Int. Cl.
*H04W 72/0446* (2023.01)
*H04W 72/02* (2009.01)
*H04W 72/21* (2023.01)
(52) U.S. Cl.
CPC ....... *H04W 72/02* (2013.01); *H04W 72/0446* (2013.01); *H04W 72/21* (2023.01)

(58) Field of Classification Search
CPC ............. H04W 72/02; H04W 72/0413; H04W 72/0446; H04W 72/12; H04W 72/1289;
(Continued)

(56) References Cited

U.S. PATENT DOCUMENTS 10,849,149 B2 * 11/2020 Xiao .................. H04W 4/46
2008/0080472 A1 * 4/2008 Bertrand ............ H04J 11/005
370/344
(Continued)

FOREIGN PATENT DOCUMENTS

CN   104601309 A *  5/2015
WO   2016/010227 A1   1/2016

OTHER PUBLICATIONS

International Search Report issued in PCT/JP2017/035196 dated Dec. 19, 2017 (4 page).
(Continued)

*Primary Examiner* — Un C Cho
*Assistant Examiner* — Lalita W Pace
(74) *Attorney, Agent, or Firm* — OSHA BERGMAN WATANABE & BURTON LLP

(57) ABSTRACT

There is provided user equipment of a radio communication system that supports TTIs having a plurality of lengths and that includes a base station and the user equipment, the user equipment including an acquisition unit configured to acquire, from the base station, information indicating a plurality of UL resources which are allocated to a plurality of symbols included in a TTI having a predetermined length and with which a scheduling request can be transmitted; and a transmission unit configured to select a UL resource from the plurality of UL resources and transmit the scheduling request to the base station with the selected UL resource.

7 Claims, 9 Drawing Sheets

(58) Field of Classification Search
CPC . H04W 72/1284; H04W 72/14; H04W 72/21; H04L 5/00
See application file for complete search history.

(56) References Cited

U.S. PATENT DOCUMENTS

| | | | | |
|---|---|---|---|---|
| 2009/0290570 A1* | 11/2009 | Kishiyama | ............... | H04B 1/59 370/344 |
| 2010/0040005 A1* | 2/2010 | Kim | ..................... | H04J 11/0069 370/329 |
| 2012/0051255 A1* | 3/2012 | Han | ........................ | H04L 47/30 370/252 |
| 2013/0028221 A1* | 1/2013 | Seo | ....................... | H04L 1/1861 370/329 |
| 2014/0056278 A1* | 2/2014 | Marinier | ............ | H04W 72/044 370/330 |
| 2015/0016350 A1* | 1/2015 | Moulsley | .......... | H04W 72/0453 370/329 |
| 2016/0050686 A1* | 2/2016 | Krishnamoorthi | .... | H04W 28/04 455/418 |
| 2016/0100407 A1* | 4/2016 | Gaal | ..................... | H04L 5/0041 370/329 |
| 2016/0105905 A1* | 4/2016 | Vajapeyam | ....... | H04W 72/1263 370/330 |
| 2016/0174214 A1 | 6/2016 | Yerramalli et al. | | |
| 2017/0048727 A1* | 2/2017 | Cho | .................. | H04W 28/0278 |
| 2017/0164363 A1* | 6/2017 | Zhang | ........................ | H04L 1/00 |
| 2017/0202009 A1* | 7/2017 | Kim | ....................... | H04W 72/21 |
| 2017/0290031 A1* | 10/2017 | Hwang | ................. | H04W 72/14 |
| 2018/0007625 A1* | 1/2018 | Yu | ......................... | H04W 48/12 |
| 2018/0049230 A1* | 2/2018 | Moradi | ............. | H04W 28/0278 |
| 2018/0070378 A1* | 3/2018 | Quan | ................. | H04W 72/1205 |
| 2018/0077718 A1* | 3/2018 | Nory | ..................... | H04L 5/0007 |
| 2018/0227938 A1* | 8/2018 | Lee | ............................ | H04L 5/00 |
| 2019/0174493 A1* | 6/2019 | Horiuchi | ........... | H04W 72/0446 |

OTHER PUBLICATIONS

Written Opinion of the International Searching Authority issued in PCT/JP2017/035196 dated Dec. 19, 2017 (4 pages).
Benjebbour, A. et al.; "5G Radio Access Technology"; NTT DoCoMo, NTT DoCoMo Technical Journal, vol. 17, No. 4, Jan. 2016, pp. 16-28 (25 pages).
NTT DoCoMo, Inc.; "On co-existence of eMBB and URLLC"; 3GPP TSG RAN WG1 Meeting #86, R1-167391; Gothenburg, Sweden; Aug. 22-26, 2016 (5 pages).

* cited by examiner

USER EQUIPMENT, BASE STATION, AND METHOD OF TRANSMITTING A SCHEDULING REQUEST

TECHNICAL FIELD

The present invention relates to user equipment, a base station, and a signal transmission method.

BACKGROUND ART

In long term evolution (LTE), in order to further increase system capacity, further increase a data transmission speed, and achieve further low latency in a radio section, a wireless communication method called 5G has been studied. In 5G, in order to satisfy the requirement that the latency of the radio section be 1 ms or less while achieving a throughput of 10 Gbps or more, various wireless techniques have been studied. In addition, in 5G, various use cases such as ultra-reliable and low latency communications (URLLC) achieving communication with ultra-low latency (for example, 0.5 ms) and high reliability (for example, reception probability of 99.999%) and eMBB (enhanced Mobile Broad Band) as high-speed data communication have been proposed, and a radio frame configuration and radio resource allocation scheme appropriate for these use cases have been studied. For example, in the URLLC, in order to achieve ultra-low latency, use of a radio frame configuration having a shorter TTI length than that of the eMBB has been studied.

PRIOR ART DOCUMENT

Non-Patent Document

Non-Patent Document 1: NTT DOCOMO, NTT DOCOMO Technical Journal "5G Radio Access Technology", January 2016

SUMMARY OF THE INVENTION

Problem to be Solved by the Invention

In 5G, in order to efficiently use radio resources while supporting both use cases of eMBB and URLLC, methods of quasi-statistically or dynamically sharing radio resources used for communication of eMBB and radio resources used for communication of URLLC within the same carrier have been studied.

Here, when amounts of traffic having different requirements are to be coexisted in the same carrier, it is to be avoided that the quality of traffic for which low latency is required (URLLC traffic) is deteriorated due to allocation of traffic for which low latency is not so required (eMBB traffic). As described above, in the URLLC, it has been studied to use a radio frame configuration having a shorter TTI length than that of the eMBB so as to achieve ultra-low latency, so that, when radio frame configurations having different TTI lengths coexist, it is necessary to provide a mechanism capable of allocating radio resources at appropriate timing for each traffic.

The disclosed technology is made in consideration of the above-described problems, and an object is to provide a technology capable of allocating radio resources at an appropriate timing in a radio communication system where radio frame configurations having different TTI lengths coexist.

Means for Solving the Problem

User equipment according to the disclosed technique is user equipment of a radio communication system that supports TTIs having a plurality of lengths and that includes a base station and the user equipment, the user equipment including an acquisition unit configured to acquire, from the base station, information indicating a plurality of UL resources which are allocated to a plurality of symbols included in a TTI having a predetermined length and with which a scheduling request can be transmitted; and a transmission unit configured to select a UL resource from the plurality of UL resources and transmit the scheduling request to the base station with the selected UL resource.

Advantage of the Invention

According to the disclosed technology, a technique is provided such that, in a radio communication system where radio frame configurations having different TTI lengths coexist, radio resources can be allocated at an appropriate timing.

EMBODIMENTS OF THE INVENTION

Hereinafter, embodiments of the present invention are described with reference to the drawings. The embodiments described hereinafter are merely exemplary ones, and the embodiments to which the present invention is applied are not limited to the following embodiments. For example, although it is assumed that the radio communication system according to the embodiment is a system based on the LTE and 5G, the present invention is not limited to the LTE and 5G, but the present invention can be applied to other systems. In the specification and the claims, the term "LTE" is used in a broad sense including not only to the communication method corresponding to 3GPP Release 8 or 9 but also to the fifth generation communication method corresponding to 3GPP Release 10,11, 12,13, 14 or later. In addition, the term "resource" denotes radio resources.

In the following description, traffic/packet/data that is not so required to be in low latency is referred to as "eMBB traffic/packet/data", and traffic/packet/data that is required to be in low latency is referred to as "URLLC traffic/packet/data".

System Configuration

Figure 1:
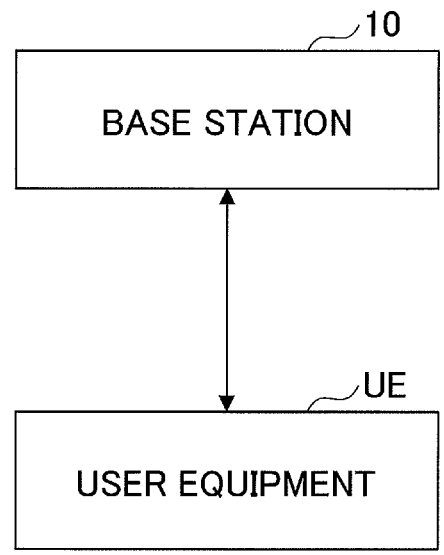
FIG. 1 is a diagram illustrating a configuration example of a radio communication system according to an embodiment.

FIG. 1 is a diagram illustrating a configuration example of a radio communication system according to an embodiment. As illustrated in FIG. 1, the radio communication system according to the embodiment is configured to include a base station 10 and user equipment UE. In the example of FIG. 1, one base station 10 and one user equipment UE are illustrated. However, the radio communication system may have a plurality of base stations 10 or may have a plurality of units of user equipment DEs.

The base station 10 has a function of performing scheduling with a predetermined TTI length in a radio frame within a carrier (within a cell) and a function of performing scheduling with a TTI length shorter than the predetermined TTI length. It is assumed that the predetermined TTI length is used for allocating (which may be referred to as scheduling) resources for eMBB traffic, and the TTI length shorter than the predetermined TTI length is used for allocating resources for URLLC traffic.

The user equipment UE has a function of performing communication by using the resource allocated with the predetermined TTI length and a function of communicating by using the resource allocated with the TTI length shorter than the predetermined TTI length. In addition, although the user equipment UE has only one of the function of performing communication by using the resource allocated with the predetermined TTI length and the function of communicating by using the resource allocated with the TTI length shorter than the predetermined TTI length, it is assumed that the user equipment UE according to the embodiment has at least the function of performing communication by using the resource allocated with the predetermined TTI length unless otherwise specified. In a case where a UL packet to be transmitted occurs, the user equipment UE requests the base station 10 to allocate a UL resource by transmitting a scheduling request (SR) to the base station 10.

In the following description, a predetermined TTI length is referred to as a "normal TTI" for the convenience, and a TTI length shorter than a predetermined TTI length is referred to as a "short TTI" for the convenience. In the description of the embodiment, it is assumed that one normal TTI is the same as a time length of one slot. However, one normal TTI may be the same as a time length of a plurality of slots (for example, two slots or the like in the LTE of the related art). In addition, one normal TTI may be the same as a time length of one subframe. The number of symbols constituting one normal TTI may be the same as the number of symbols (for example, 12 symbols or 14 symbols) in the LTE of the related art. In addition, but not limited thereto, the number of symbols may be different from the number of symbols (for example, 7 symbols) in the LTE of the related art.

The short TTI corresponds to an arbitrary portion of symbols among the plurality of symbols constituting the normal TTI. More specifically, in a case where it is assumed that the normal TTI is configured with 14 symbols, the base station 10 performs an operation of scheduling, for example, the fourth and fifth symbols among the 14 symbols as a short TTI. In addition, a time length of short TTI may be referred to as a mini slot.

Processing Procedure

Subsequently, a processing procedure performed by the radio communication system according to the embodiment is described. The base station 10 may preset a resource (hereinafter, a resource with which an SR can be transmitted being referred to as an "SR resource" for the convenience) with which the SR can be transmitted from the user equipment UE in the user equipment UE. In a case where a UL packet to be transmitted occurs, the user equipment UE requests the base station 10 to allocate a UL resource by transmitting the SR with the preset SR resource.

(Configuration of SR Resources)

Figure 2A:
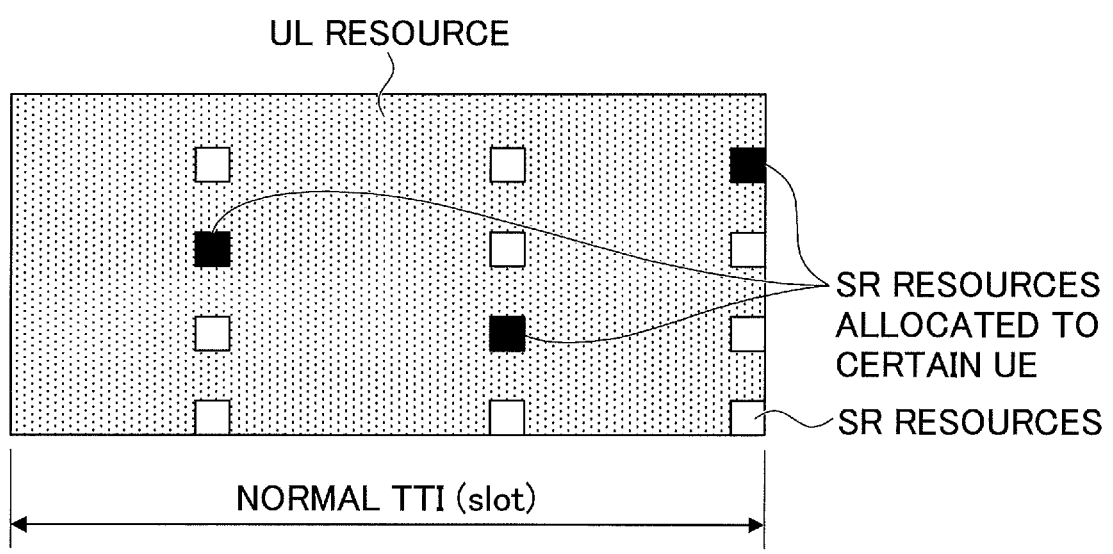
FIG. 2A is a diagram illustrating an example of a configuration of SR resources (slot of UL)
Figure 2B:
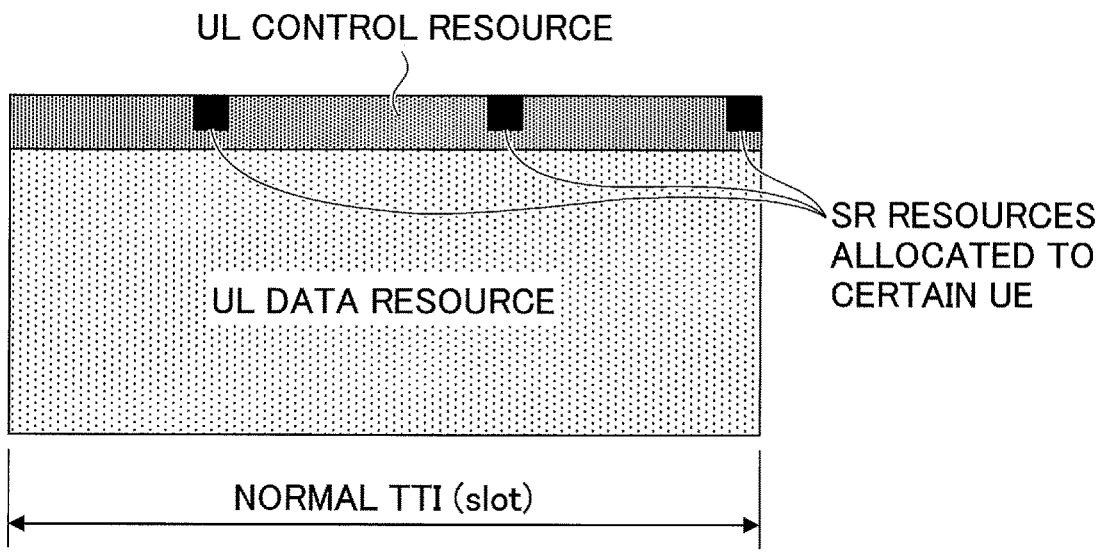
FIG. 2B is a diagram illustrating an example of a configuration of SR resources (slot of UL)
Figure 3A:
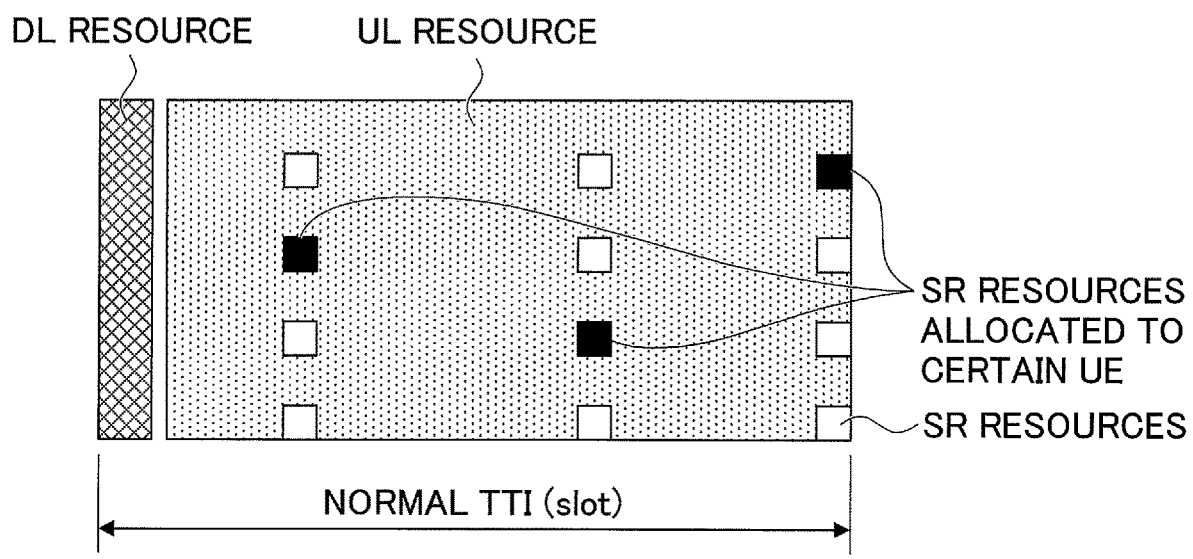
FIG. 3A is a diagram illustrating an example of a configuration of SR resources (shared slot for DL/UL)
Figure 3B:
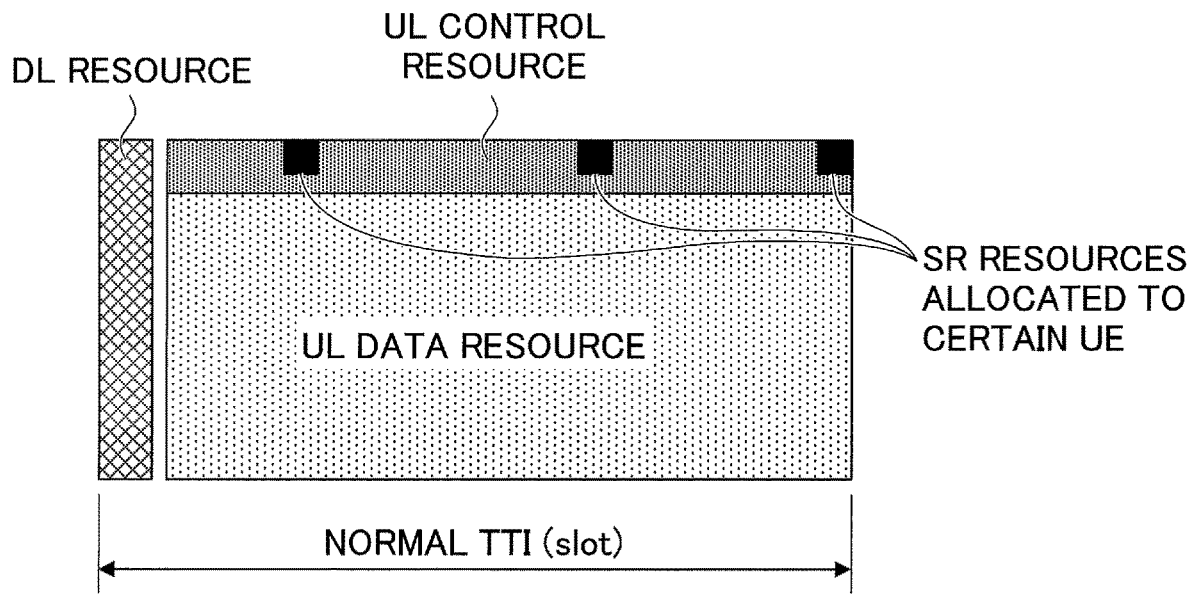
FIG. 3B is a diagram illustrating an example of a configuration of SR resources (shared slot for DL/UL)

FIGS. 2A-2B are diagrams illustrating examples of configurations of of SR resources (a UL slot). FIGS. 3A-3B are diagrams illustrating examples of configurations of the SR resources (shared slot for DL/UL). In FIGS. 2A-2B and 3A-3B, an FDD method and a TDD method are assumed, respectively. In FIGS. 2A-2B, in the TDD method, slots where all symbols are configured for UL are included. As illustrated in FIG. 2A and FIG. 3A, the base station 10 configures one or a plurality of SR resources in the frequency direction for each of a plurality of different symbols within one TTI. In addition, as illustrated in FIGS. 2B and 3B, in a case where a band for transmitting the UL control signal is configured for a predetermined band within the system band, the base station 10 may configure one or more SR resources in the frequency direction for each of the plurality of different symbols within one TTI in the predetermined band. Therefore, in a case where the UL packet to be transmitted occurs, the user equipment UE can transmit the SR with the SR resource close to a timing at which the UL packet occurs, so that it is possible to promptly request the base station 10 to allocate the UL resources. In addition, the position of the DL resource illustrated in FIGS. 3A-3B is merely an example, and it is not intended to be limited to the illustrated position.

The SR may be a predetermined signal series or may be data having a predetermined data length (hereinafter, referred to as "data type SR"). In addition, in order to enable the same SR resource to be used among a plurality of units of user equipment UE, the SR may be code-multiplexed. In a case where the SR transmission and the UL data transmission are simultaneously performed, a reference signal used for demodulation of the data type SR and a reference signal used for demodulating the UL data may be common or may be independent. In the latter case, the user equipment UE may transmit both the data type SR and the reference signal with SR resource. In the data type SR, only control information such as a buffer status report (BSR) may be transmitted, or short data having a fixed length or less may be transmitted.

The position of the SR resource is set (notified) from the base station 10 to the user equipment UE by using broadcast information, radio resource control (RRC) signaling, control information of Layer 2, or control information of Layer 1. In addition, the base station 10 may notify, to the user equipment UE, a plurality of SR resource candidates by using the broadcast information or the RRC signaling, and the SR resource actually set to the user equipment UE may notified by using control information of layer 2 or control information of Layer 1. Therefore, it is possible to dynamically set an appropriate SR resource to the user equipment UE according to whether or not there is a possibility of allocating the resource of short TTI to the user equipment UE, the scheduling situation, and the like.

[Notification of Type of UL Resource of which Allocation is Requested]

By transmitting the SR according to the SR transmission method where the type of UL resource (UL resource of normal TTI or UL resource of short TTI) of which allocation is requested by the user equipment UE is in correspondence with the type of UL resource, it is possible to implicitly notify to the base station 10. The SR transmission method in correspondence with the type of UL resource is, for example, a time resource through which the SR is transmitted, a frequency resource through which the SR is transmitted, a series of SRs to be transmitted, the number of symbols occupied by the SR to be transmitted, and/or the number of subcarriers occupied by the SR to be transmitted. The correspondence between the SR transmission method and the type of the UL resource may be defined by the standard specification, may be pre-configured in the user equipment UE, or may be set in the user equipment UE by using the RRC signaling or broadcast information. In addition, the SR transmission method may be in correspondence with an uplink logical channel and/or a packet priority.

Figure 4A:
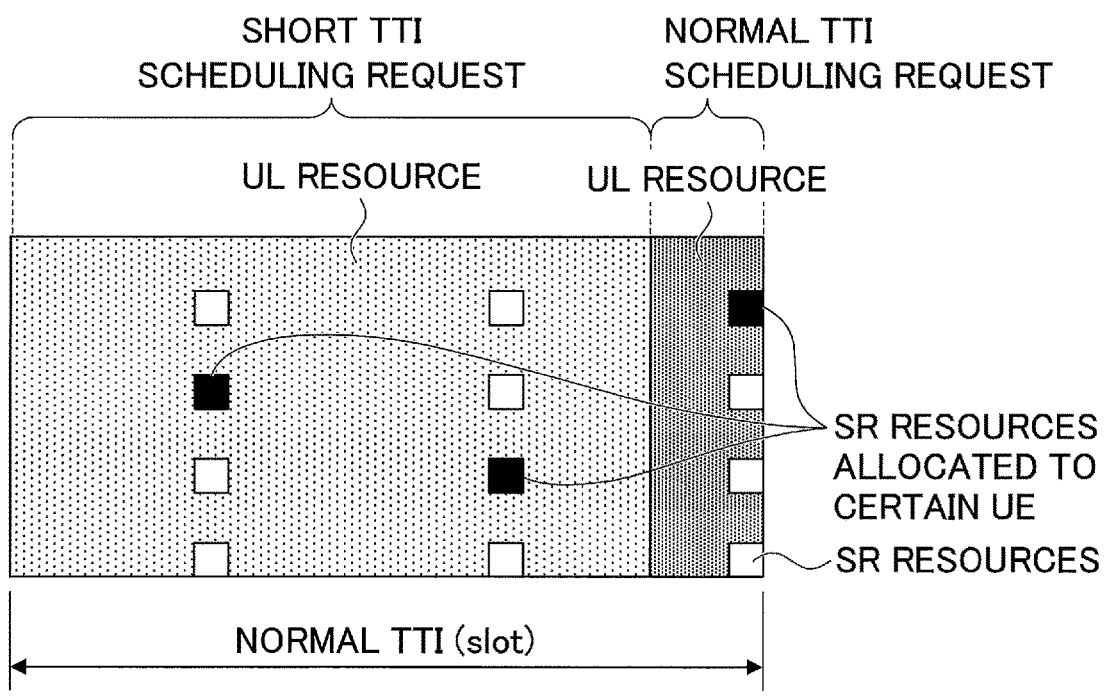
FIG. 4A is a diagram for describing an operation of implicitly notifying a type of a UL of which allocation is requested.
Figure 4B:
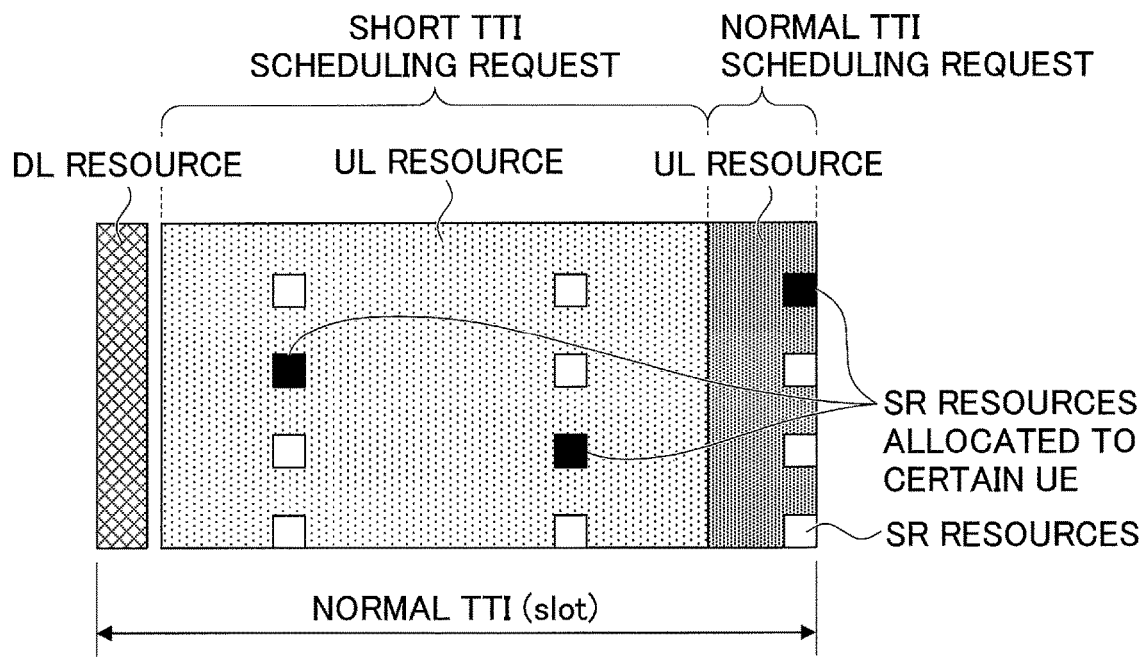
FIG. 4B is a diagram for describing an operation of implicitly notifying a type of a UL of which allocation is requested.

FIGS. 4A-4B illustrate a specific example in a case where the type of the UL resource for which the user equipment UE requests allocation is notified by using the time resource with which the SR is transmitted. For example, in the example of FIGS. 4A and 4B, in a case where the SR is received with the SR resources included in the first half area (the area indicated by "short TTI scheduling request" in the figure), the base station 10 recognizes that the user equipment UE requests for the UL resource of short TTI, and in a case where the SR is received with the SR resources included in the latter half area (the area indicated by "normal TTI scheduling request"), the base station 10 recognizes that the user equipment UE requests for the UL resource of normal TTI.

In addition, the SR resource area corresponding to the short TTI scheduling request and the SR resource area corresponding to the normal TTI scheduling request may overlap with each other. For example, in the example of FIGS. 4A and 4B, in the case of the SR is received with the SR resources included in the latter half area, the base station 10 may recognize that one UL resource requests for one of the UL resources of normal TTI or the UL resources of short TTI. In this case, the base station 10 may determine which one of the UL resource of normal TTI and the UL resources of short TTI the user equipment UE requests for, on the basis of the capability (UE Capability) of the user equipment UE, the type of the radio bearer established between the user equipment UE and the base station 10, or the like. For example, it is considered that, in the case of determining on the basis of the capability of the user equipment UE, if the user equipment UE has the capability of corresponding to the short TTI, the base station 10 allocates the UL resource of short TTI, and if the user equipment UE does not have the capability of corresponding to the short TTI, the base station 10 allocate the UL resource of normal TTI. In addition, it is considered that, in the case of determining on the basis of the type of the radio bearer, if the radio bearer of the URLLC is established, the base station 10 allocates the UL resource of short TTI, and if the radio bearer of the eMBB is established, the base station 10 allocates the UL of normal TTI.

(SR Transmission Method)

the standard specifications or higher layer (broadcast information or RRC signaling) are regulated in advance so that one SR denotes a predetermined data size, and when the user equipment UE requests for the allocation of the UL resources, the user equipment UE transmits the SRs corresponding to the number of SRs according to the data size of the UL packet scheduled to be transmitted by the user equipment UE (the data size stored in the transmission buffer of the user equipment UE). As a specific example, one SR is regulated in advance to denote 200 bytes, and in a case where data of 550 bytes is stored in the transmission buffer of the user equipment UE, the user equipment UE may transmit three SRs by using three SR resources existing within one normal TTI. The base station 10 can recognize the size of the data scheduled to be transmitted by the user equipment UE on the basis of the number of SRs received within one normal TTI and can reflect the result on the scheduling process.

In addition, as described above, in the case of implicitly notifying, to the base station 10, the type of the UL of which allocation is requested on the basis of the SR resource area (position), the user equipment UE can realize an operation of notifying, to the base station 10, the data size in the transmission buffer corresponding to the type of the UL of which allocation is requested by transmitting a plurality of SRs in the area corresponding to the type of the UL of which allocation is requested.

In addition, as another example, the user equipment UE may transmit the SRs with a plurality of (or all) SR resources within one normal TTI so as to improve the detection accuracy of the SRs on the side of the base station 10. A plurality (or all) of the SR resources with which the SRs are transmitted may be limited to the SR resources in the above-described area. In addition, the user equipment UE may transmit the SRs with a predetermined ratio (for example, at least 50% or more) of the SR resources within one normal TTI according to radio quality (reception quality of DL or the like). By decreasing the number of SRs to be transmitted in a case where the radio quality is good and by increasing the number of SRs to be transmitted in a case where the radio quality is deteriorated, it is possible to reduce the power consumption of the user equipment UE and to improve the detection accuracy of the SR on the base station 10 side.

In addition, in the case of transmitting a plurality of the SRs, the user equipment UE may change the transmission power parameter according to the area where the SR resource is set. For example, in a case where the SR resource is set in the resource area allocated to the UL data channel, it is considered that the user equipment UE transmits the SR with the transmission power corresponding to the UL data channel. In addition, for example, in a case where the SR resource is set in the resource area allocated to the UL control channel, it is considered the user equipment UE transmits the SR with the transmission power corresponding to the UL control channel. Therefore, it possible to suppress the interference between the SR and the signal to be transmitted through the other channel.

(SR Transmission During UL Data Transmission)

By applying orthogonal frequency division multiplexing (OFDM) to the UL, the user equipment UE may simultaneously perform SR transmission and UL data transmission by using the same symbol.

Figure 5:
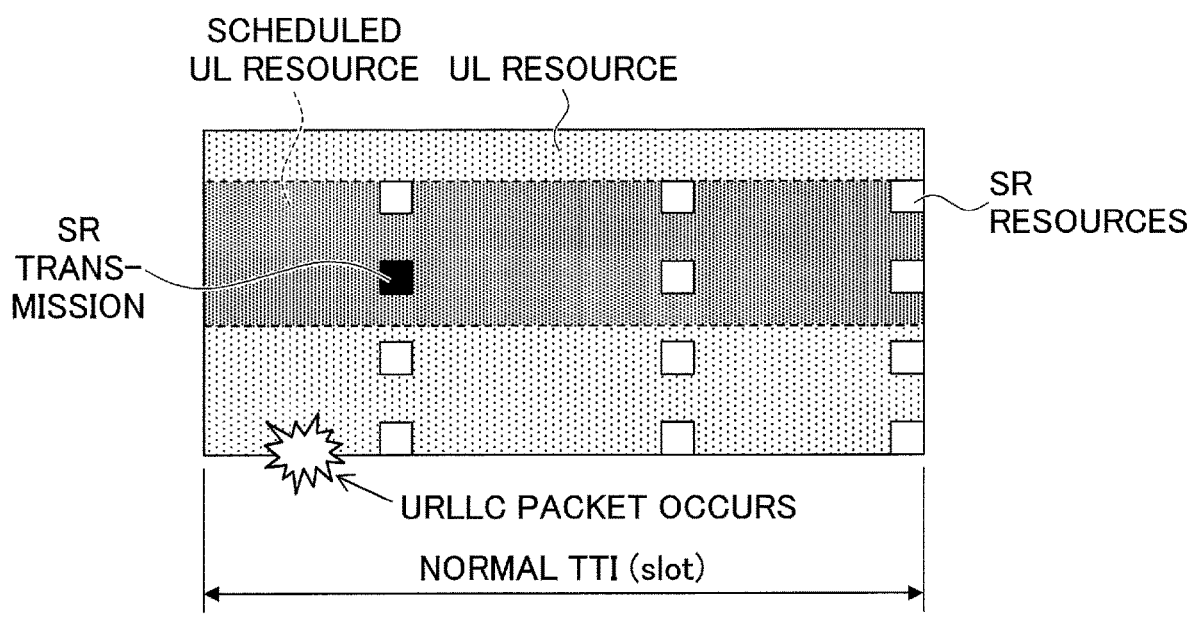
FIG. 5 is a diagram for describing an operation where an SR is transmitted during UL data transmission.

The user equipment UE having the ability to transmit the SR during the UL data transmission may transmit the SR concurrently even during the UL data transmission with the UL resource of normal TTI. For example, as illustrated in FIG. 5, in a case where a URLLC packet occurs in the higher layer (in the application layer or the like) after starting of the UL data transmission with the allocated UL resource, the user equipment UE may transmit the SR with the SR resource at the next timing when the URLLC packet occurs. Therefore, for example, the user equipment UE can request the base station 10 to allocate the UL resource for the URLLC data transmission even during the eMBB data transmission, so that it is possible to quickly perform transmission of data for which lower latency is required.

In addition, in the case of transmitting the SR after transmitting the UL data in the normal TTI, only if it is determined that the latency condition (for example, less than one normal TTI or the like) required for the URLLC packet cannot be satisfied, the user equipment UE may consider that there is no UL resource corresponding to the packet and may transmit the SR concurrently with the transmission of the UL data. If it is determined that the latency condition can be satisfied, the user equipment UE may transmit the SR after the transmission of the UL data is completed (for example, in the next normal TTI).

In addition, the user equipment UE that does not have the ability to transmit the SR during the UL data transmission or the user equipment UE instructed by the base station 10 not to transmit the SR during the UL data transmission may transmit the SR after dropping (stopping) or puncturing (not transmitting) the transmission of the UL data with the allocated UL resource.

(Operation Related to UL Data Transmission)

In the LTE of the related art, it is regulated that, in a case where data of a plurality of logical channels are stored in the transmission buffer of the user equipment UE, data are mapped to the UL resource and are transmitted in descending order of priority of the data. However, in 5G, it is assumed that, even as data with a high priority, there are data requiring lower latency and higher reliability such URLLC and data requiring latency and reliability such as eMBB. Therefore, it is preferable that, even as the data with a high priority, the data with lower latency and higher reliability such as URLLC is transmitted with the UL resource satisfying the requirement.

Therefore, with respect to specific UL data (for example, packets with a high priority, data belonging to a specific logical channel or specific logical connection, or the like) and for which low latency and high reliability are required, and in a case where it is determined that the requirement that the UL resource allocated in the normal TTI cannot be satisfied, the user equipment UE may not transmit the specific UL data with the UL resource allocated in the normal TTI. Therefore, it is possible to avoid transmitting the specific UL data for which low latency and high reliability are required with the UL resources not satisfying the requirement.

In addition, in a case where there is no other UL data scheduled to be transmitted other than the specific UL data, the user equipment UE may transmit padding data with the allocated UL resource. It is possible to erroneously recognize that the base station 10 has failed in receiving the UL data and to prevent the allocation of the UL resource again.

In addition, even in a case where it is determined that the requirement cannot be satisfied, if the SR resource is not set, the user equipment UE cannot request the base station 10 to allocate another UL resource. Therefore, even in a case where it is determined that the requirement cannot be satisfied, if the SR resource is not set within a period of the UL resource allocated in the normal TTI, the user equipment UE may transmit the UL data with the UL resource allocated in the normal TTI. On the other hand, if the SR resource is set within the period of the UL resource allocated in the normal TTI, the user equipment UE may request the base station 10 to allocate another UL resource (UL resource of short TTI) by transmitting the SR by using the set SR resource.

In addition, in order to allow the user equipment UE to easily recognize the conditions of latency and reliability in the allocated UL resource, the base station 10 may allow scheduling control information (UL grant) of the UL resource to include an identifier indicating the type (URLLC data, eMBB data, and the like) of the transmittable UL data or an identifier indicating the quality (a level of latency and a level of reliability) of the resource. On the basis of the identifier, the user equipment UE can easily determine whether or not to transmit the UL data. The identifier indicating the type of the UL data may be a logical channel number or a priority identifier. In addition, the identifier indicating the type of the UL data may be a CRC mask (RNTI) of the scheduling control information including the identifier or may be a reference signal position/series of the scheduling control information including the identifier. Signaling overhead can be reduced. In addition, the type of the UL data may be identified on the basis of the resource (time, frequency, and code) with which the scheduling control information is notified. The type of the UL data in correspondence with the resource with which the scheduling control information is notified may be defined advance, or the base station 10 may set the type of the UL data by higher layer signaling.

(Allocation of Resources within TTI)

When allocating the UL resources of normal TTI, the base station 10 may allocate UL resources divided into a plurality of areas in the time direction within one TTI as UL resources (TL) with which a transport block (TB) at each of the UL resources can be transmitted. In addition, the user equipment UE may transmit the BSR to the base station 10 with the UL resource corresponding to any one of the UL resources divided into a plurality of areas.

Figure 6A:
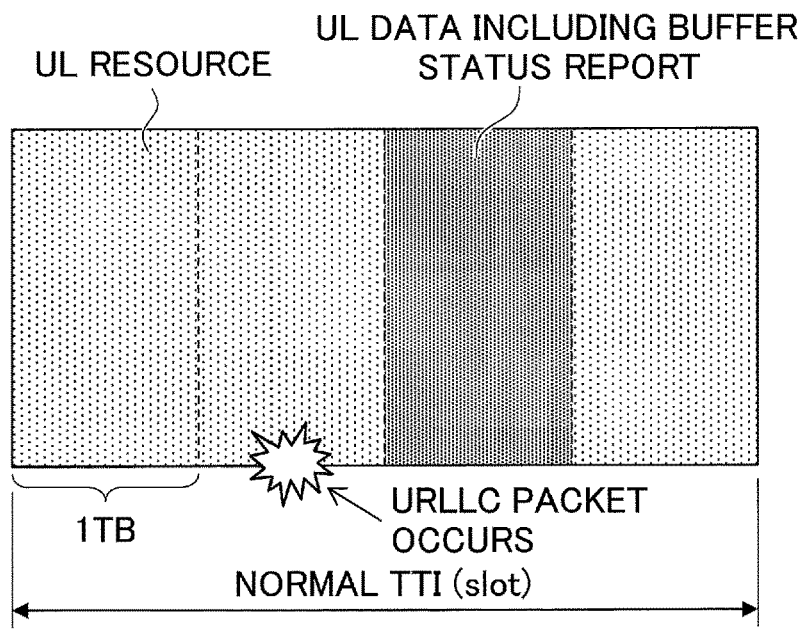
FIG. 6A is a diagram illustrating UL resources divided into a plurality of areas that can transmit TBs.

This is specifically described with reference to the drawings. It is assumed that four areas with which the TB in each can be transmitted are allocated in the time direction within one normal TTI. For example, as illustrated in FIG. 6A, for example, in a case where a URLLC packet occurs in the user equipment UE at the time point of the second area from the left, the user equipment UE transmits the TB being transmitted at the third area from the left and including a BSR that explicitly or implicitly indicates the request for the UL resource allocation of short TTI. Since the BSR requests the UL resource allocation similarly to the SR, it can also be expressed that the user equipment UE transmits the BSR as "SR". Therefore, there is no need to transmit the SR to request allocation of the UL resource of short TTI, and the overhead of the signaling transmitted and received between the user equipment UE and the base station 10 can be reduced.

Figure 6B:
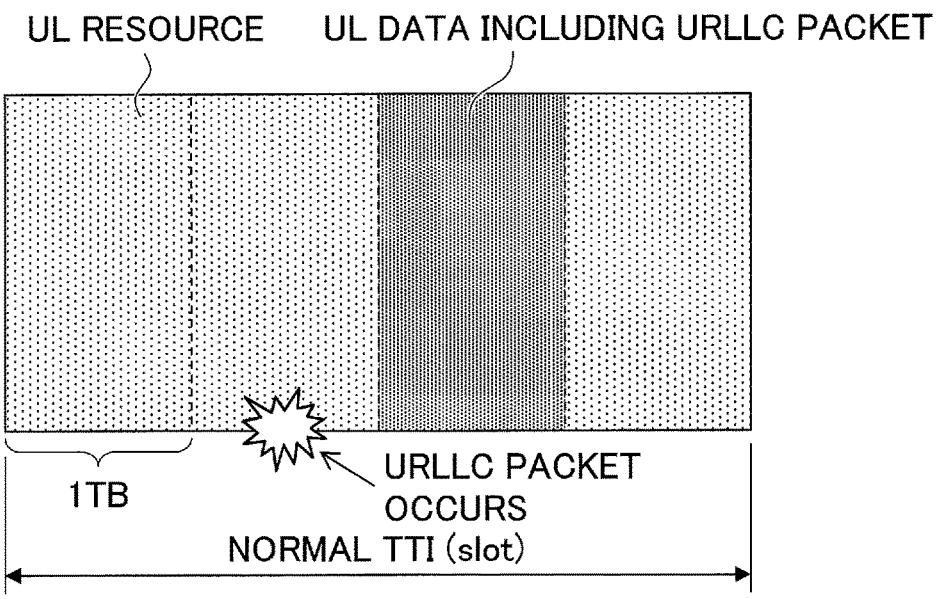
FIG. 6B is a diagram illustrating UL resources divided into a plurality of areas that can transmit TBs.

In addition, as illustrated in FIG. 6B, the user equipment UE may transmit the TB including the URLLC packet instead of the BSR. The user equipment UE may determine whether or not the URLLC packet can be transmitted on the basis of a modulation and coding scheme (MCS) applied to the allocated UL resource or the like. In addition, in order to allow the user equipment UE side to easily determine whether or not the URLLC packet can be transmitted, the base station 10 may allow scheduling control information (UL grant) of the UL resource to include an identifier indicating the type of UL data (URLLC data, eMBB data, or the like) of the UL data transmittable in each area or an identifier indicating the quality (a level of latency and a level of reliability, or the like) of the resource in each area. The identifier indicating the type of the UL data may be a logical channel number or a priority identifier. In addition, the identifier indicating the type of the UL data may be a CRC mask (RNTI) of the scheduling control information including the identifier or may be a reference signal position/series of the scheduling control information including the identifier. Signaling overhead can be reduced. In addition, the type of the UL data may be identified on the basis of the resource (time, frequency, and code) with which the scheduling control information is notified. The type of the UL data in correspondence with the resource with which the scheduling control information is notified may be defined in advance, or the base station 10 may be set the type of the UL data by higher layer signaling.

[HARQ Process ID]

Figure 7:
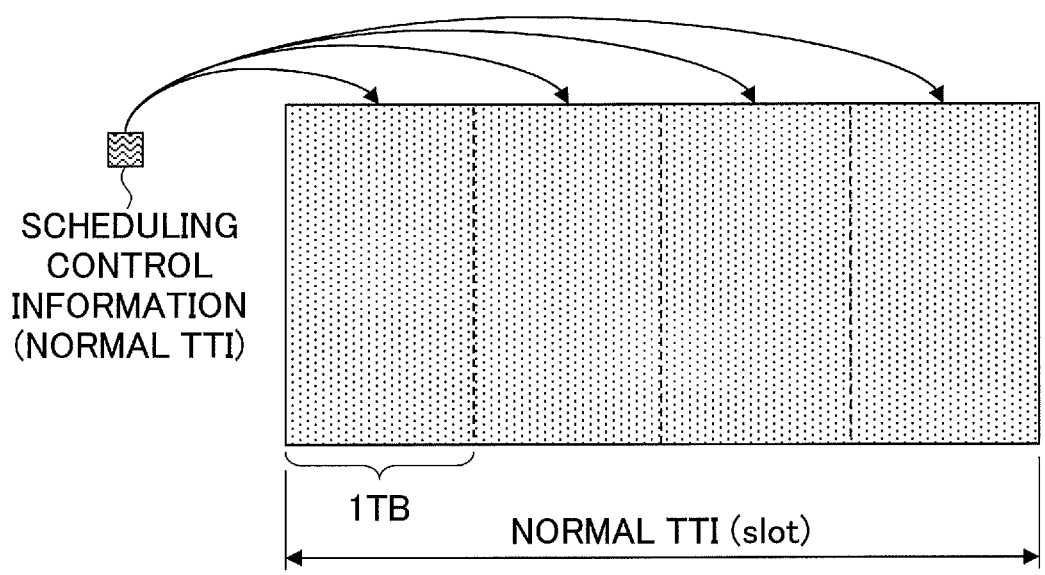
FIG. 7 is a diagram illustrating an example of UL resource allocation according to scheduling control information.

As described above, the base station 10 may allocate the HARQ process ID for each TB to be included in the scheduling control information (UL grant) illustrated in FIG. 7 at the time of allocating the UL resources divided into a plurality of areas, each of which can transmit a TB. In addition, instead of including the HARQ process ID for each TB, the base station 10 may include only the leading HARQ process ID among the HARQ process IDs grouped by using a higher layer (such as RRC signaling) in advance. For example, in a case where HARQ process IDs #1, #2, #3, and #4 are grouped, the base station 10 may include only the HARQ process ID #1 in the scheduling control information (UL grant). The user equipment UE can grasp the HARQ process ID corresponding to each TB and can perform re-transmission control by the HARQ for each TB.

When re-transmitting the TB, the user equipment UE may transmit the re-transmission TB with the UL resource of normal TTI allocated at another timing, or may transmit the re-transmission TB with the UL resource of short TTI. The latter case, can be realized by setting each of a plurality of the areas through a plurality of TBs can be transmitted to have the same length as the short TTI, and it is possible to shorten the re-transmission latency.

The operation described above in "(Allocation of Resources Within TTI)" can also be applied to downlink (DL). In this case, the user equipment UE may transmit ACK/NACK for each TB to the base station 10 by using the resource instructed for each TB as a resource for transmitting the ACK/NACK.

In addition, the user equipment UE may transmit bit map information indicating the ACK/NACK for each HARQ process ID to the base station 10 by using one resource for transmitting the ACK/NACK. In addition, the user equipment UE may merge the ACK/NACK for each HARQ process ID and transmit the ACK/NACK to the base station 10 by using one resource for transmitting the ACK/NACK. For example, only in a case where all of the ACK/NACKs of the HARQ process IDs are ACKs, the user equipment UE may transmit the ACK, and in a case where any one is NACK, the user equipment UE may transmit the NACK. Therefore, in the DL, it is possible to collectively transmit ACK/NACKs for a plurality of the TBs with one resource, so that it is possible to reduce the signaling overhead.

[Operation in Case where Scheduling Overlaps]

Figure 8A:
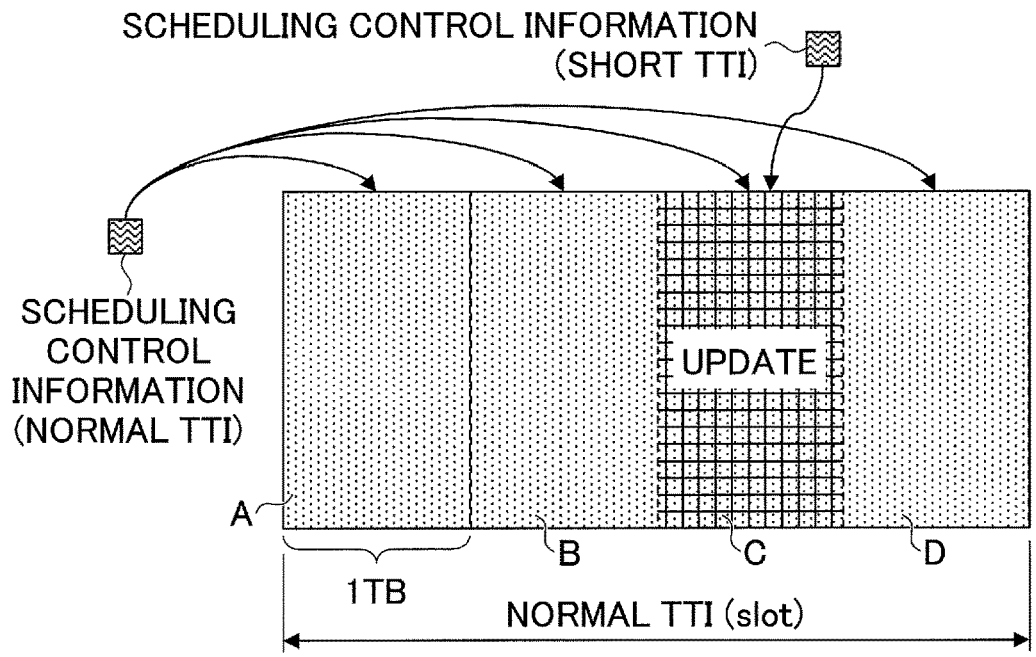
FIG. 8A is a diagram for describing an operation when the allocated UL resources overlap.

In a case where the user equipment receives both the scheduling control information on the normal TTI (UL grant) and the scheduling control information on the short TTI (UL grant) from the base station 10 and in a case where the resource allocated as the normal TTI and the resource allocated as the short TTI overlap, the user equipment UE may update (overwrite) the overlapping resource with the scheduling control information on the short TTI or may discard (ignore) the scheduling control information on the short TTI. In the former case, for example, it is considered that the user equipment UE perform an operation of transmitting a TB including a data of an eMBB with non-overlapping resources (A, B, and D in FIG. 8A) and an operation of transmitting a TB including a data of an URLLC with overlapping resources (C in FIG. 8A). In the latter case, it is considered that the user equipment UE performs an operation of transmitting a TB including a data of an eMBB data with each resource (A, B, C, and D in FIG. 8A).

In a case where the user equipment UE updates (overwrites) a portion of the UL resources divided into a plurality of areas and transmits the UL data of short TTI, since deterioration of the BLER (Block Error Rate) for the UL data of normal TTI does not occur, simply by puncturing a portion of the UL resource of normal TTI, it is possible to increase the frequency use efficiency in comparison with to the case of transmitting the data of short TTI.

In addition, the user equipment UE determines on the basis of the time at which the scheduling control information is received which one of the scheduling control information on the normal TTI and the scheduling control information on the short TTI is to be prioritized (for example, the latter received one is prioritized). In addition, the user equipment UE may determine on the basis of the type/flag or the like included in the scheduling control information which one is to be prioritized (for example, the one with the shorter latency at the time of data transmission is prioritized).

Figure 8B:
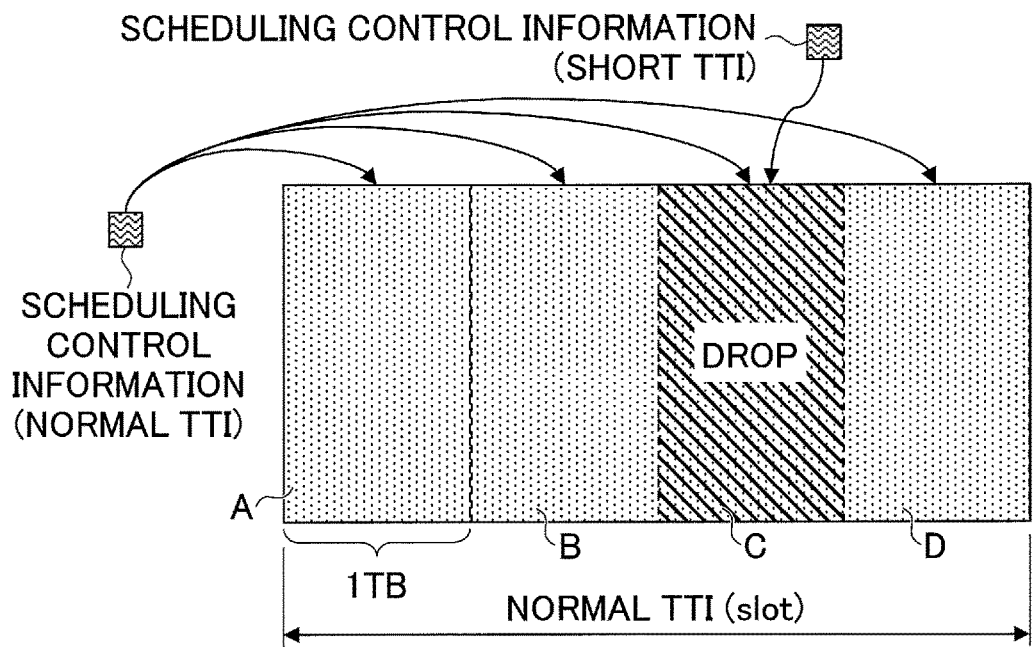
FIG. 8B is a diagram for describing an operation when the allocated UL resources overlap.

In addition, as another method, in a case where the user equipment UE receives both the scheduling control information on the normal TTI and the scheduling control information on the short TTI from the base station 10 and in a case where the resource allocated as the normal TTI and the resource allocated as the short TTI overlap with each other, nothing may be transmitted (data is dropped) with the overlapping resource (C in FIG. 8B).

Functional Configuration (User Equipment)

Figure 9:
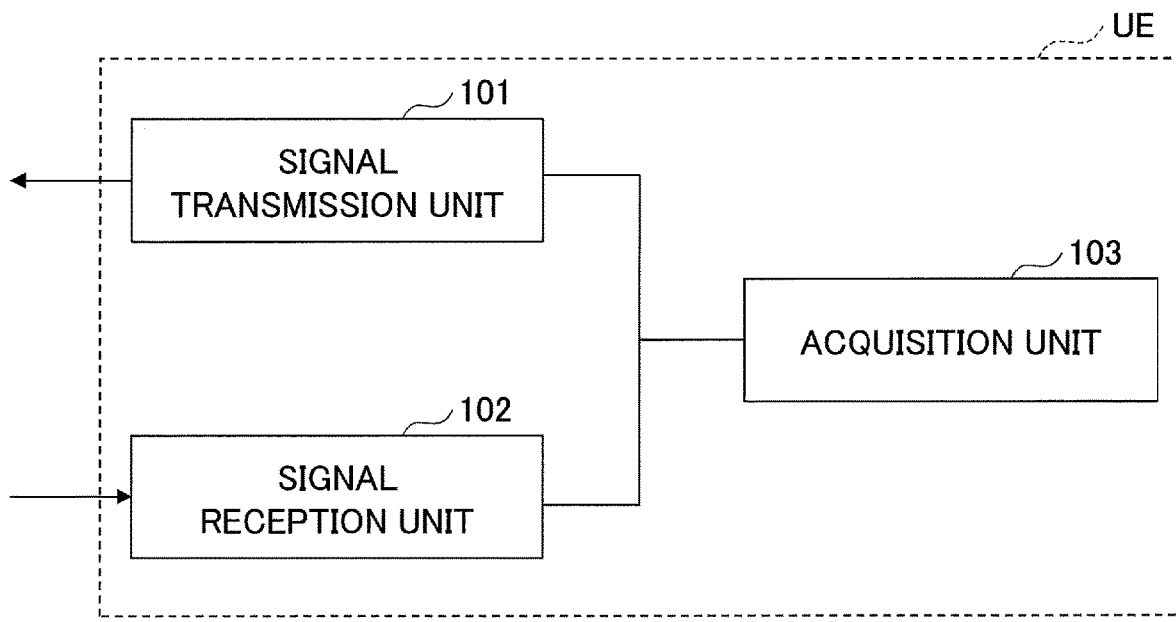
FIG. 9 is a diagram illustrating an example of a functional configuration of user equipment according to the embodiment.

FIG. 9 is a diagram illustrating a functional configuration example of the user equipment according to the embodiment. As illustrated in FIG. 9, the user equipment UE is configured to include a signal transmission unit 101, a signal reception unit 102, and an acquisition unit 103. In addition, FIG. 9 illustrates only the functional units particularly relating to the embodiment of the present invention in the user equipment UE. In addition, the functional configuration illustrated in FIG. 9 is merely an example. As long as the operation according to the embodiment can be executed, any functional division and any names of functional units may be available.

The signal transmission unit 101 has a function of generating various types of signals of the physical layer from signals to be transmitted to the base station 10 and wirelessly transmitting the signals. The signal reception unit 102 has a function of wirelessly receiving various types of signals from the base station 10 and acquiring signals of the higher layer from the signals of the received physical layer.

In addition, the signal transmission unit 101 has a function of selecting an SR resource from a plurality of SR resources and transmitting the SR to the base station 10 with the selected SR resource. In addition, in the case of requesting for the scheduling of the UL resource with which data can be transmitted with the short TTI, the signal transmission unit 101 may transmit the SR according to the SR transmission method indicating the request for the scheduling of the UL resource with which data can be transmitted with the short TTI. In addition, one SR denotes a data size of a predetermined unit, and the signal transmission unit 101 calculates the number of SRs to be transmitted to the base station 10 on the basis of the data size of the predetermined unit and the data size of the UL data stored in the transmission buffer of the user equipment UE, select the same number of the SR resources as the calculated number of the SR resources, and transmit the SR with each of a plurality of the selected SR resources. In addition, the signal transmission unit 101 may transmit the BSR with the UL resource corresponding to any one of the UL resources divided into a plurality of areas.

The acquisition unit 103 has a function of acquiring, from the base station 10, information indicating a plurality of SR resources which are allocated to a plurality of symbols included in the normal TTI and can transmit the SRs. In addition, the acquisition unit 103 may acquire, from the base station 10, scheduling information indicating the UL resources which is UL resources divided into a plurality of areas in the time direction within the normal TTI and can transmit a transport block with each of the UL resources.

(Base Station)

Figure 10:
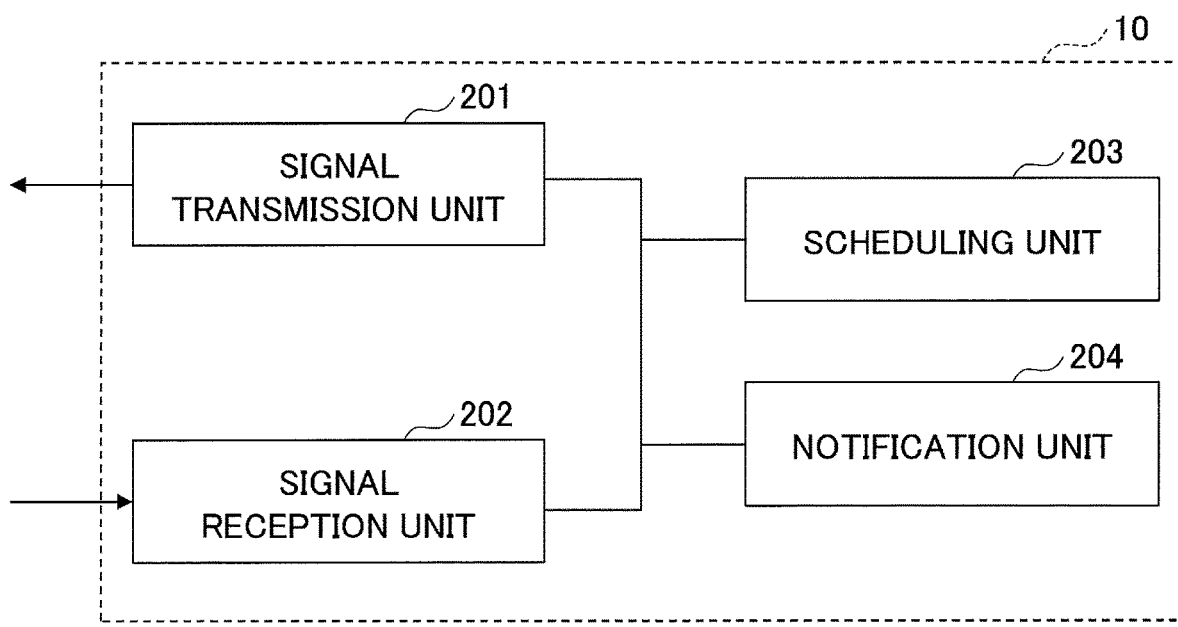
FIG. 10 is a diagram illustrating an example of a functional configuration of a base station according to the embodiment.

FIG. 10 is a diagram illustrating a functional configuration example of the base station according to the embodiment. As illustrated in FIG. 10, the base station 10 is configured to include a signal transmission unit 201, a signal reception unit 202, a scheduling unit 203, and a notification unit 204. In addition, FIG. 10 illustrates only the functional units particularly relating to the embodiment of the present invention in the base station 10.

The signal transmission unit 201 has a function of generating various types of signals of the physical layer from signals of the higher layer to be transmitted from the base station 10 and wirelessly transmitting the signals. The signal reception unit 202 has a function of wirelessly receiving various types of signals from the user equipment UE and acquiring signals of a higher layer from the received signals of the physical layer. In addition, the signal reception unit 202 has a function of receiving an SR with one or more SR resources selected from a plurality of the SR resources.

The scheduling unit 203 has a function of allocating the UL resources to the user equipment UE. The notification unit 204 has a function of notifying the user equipment UE of information indicating a plurality of the SR resources which are allocated to a plurality of symbols in the normal TTI and can transmit the SRs.

Hardware Configuration

The block diagrams (FIGS. 9 and 10) used in the description of the above-described embodiment illustrate the blocks of functional units. These functional blocks (constituent units) are realized by arbitrary combination of hardware and/or software. In addition, means for implementing each functional block is not particularly limited. Namely, each functional block may be realized by one physically and/or logically combined device. Alternatively, two or more physically and/or logically separated devices may be directly and/or indirectly connected (for example, in a wired and/or wireless manner), and thus, each functional block may be realized by these plural devices.

Figure 11:
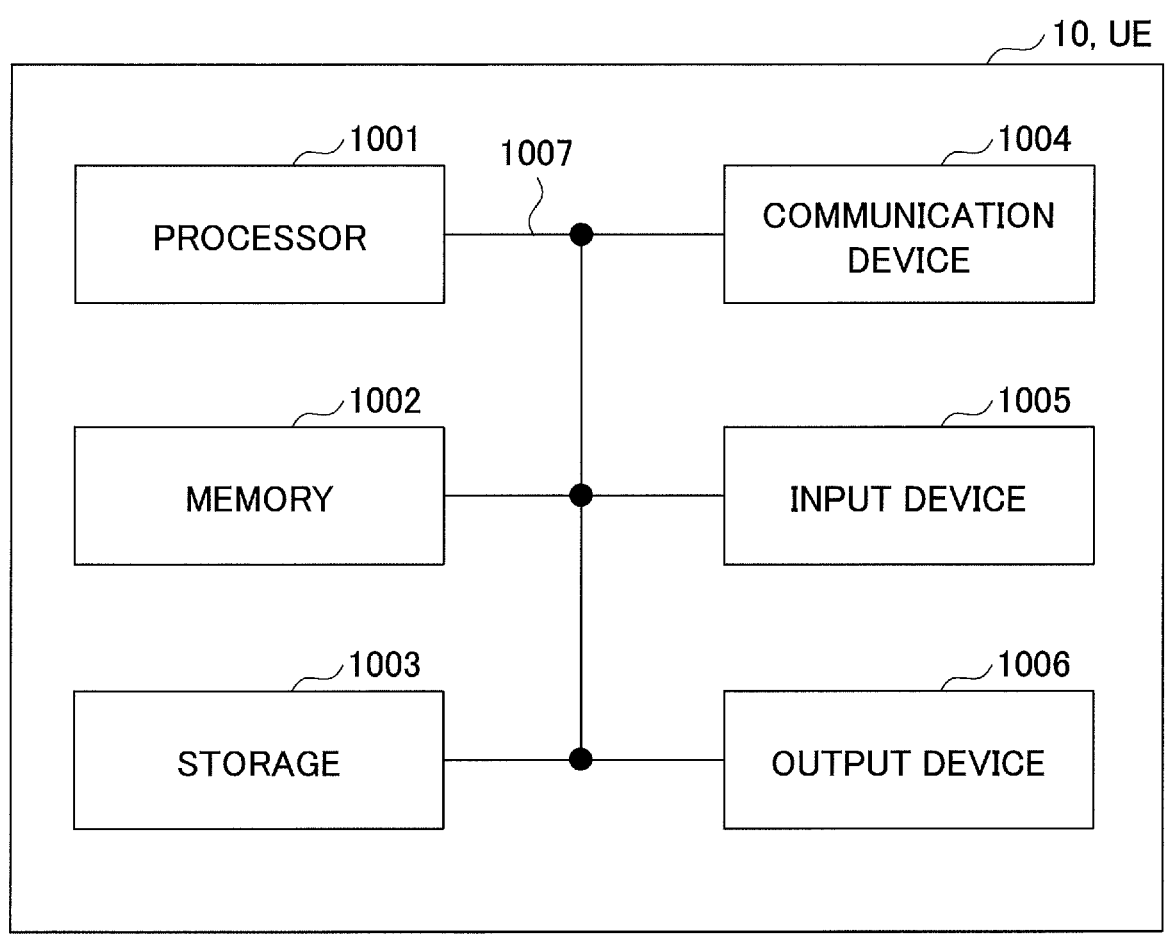
FIG. 11 is a diagram illustrating an example of a hardware configuration of the base station and the user equipment according to the embodiment.

For example, the base station 10 and the user equipment UE according to an embodiment of the present invention may function as a computer that performs processing of the signal transmission method according to the present invention. FIG. 11 is a diagram illustrating a hardware configuration example of the base station 10 and the user equipment UE according to the embodiment. The base station 10 and the user equipment UE described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of the base station 10 and the user equipment UE may be configured to include one or a plurality of devices illustrated in the drawings or may be configured not to include some of the devices.

Each function of the base station 10 and the user equipment UE is realized by allowing the processor 1001 to perform a calculation by allowing predetermined software (programs) to be loaded on hardware such as the processor 1001 and the memory 1002 and controlling communication by the communication device 1004 and reading and/or writing of data in the memory 1002 and the storage 1003.

The processor 1001 operates, for example, the operating system to control the whole computer. The processor 1001 may be configured with a central processing unit (CPU) including an interface with a peripheral device, a control device, an arithmetic device, a register, and the like. For example, the signal transmission unit 101, the signal reception unit 102, and the acquisition unit 103 of the user equipment UE and the signal transmission unit 201, the signal reception unit 202, the scheduling unit 203, and the notification unit 204 of the base station 10 may be realized by the processor 1001.

In addition, the processor 1001 reads a program (program code), a software module, or data from the storage 1003 and/or the communication device 1004 to the memory 1002, and executes various types of processing according to the program and the like. As the program, a program that allows a computer to execute at least a portion of the operation described in the above-described embodiment is used. For example, the signal transmission unit 101, the signal reception unit 102 and the acquisition unit 103 of the user equipment UE and the signal transmission unit 201, the signal reception unit 202, the scheduling unit 203, and the notification unit 204 of the base station 10, may be realized by a control program that is stored in the memory 1002 and operates through the processor 1001, and other functional blocks may also be realized in the same manner. Although it has been described that the above-described various types of processing are executed by one processor 1001, it may be executed simultaneously or sequentially by two or more processors 1001. The processor 1001 may be implemented with one or more chips. In addition, the program may be transmitted from the network via an electric communication line.

The memory 1002 is a computer-readable recording medium and is configured with, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (main memory), or the like. The memory 1002 can store executable programs (program codes), software modules, and the like for implementing the signal transmission method according to an embodiment of the present invention.

The storage 1003 is a computer-readable recording medium, and may be configured to include, for example, at least one of an optical disk such as a compact disc ROM (CD-ROM), a hard disk drive, a flexible disk, a magneto-optical disk (for example, a compact disk, a digital versatile disk, a Blu-ray (registered trademark) disk, or the like), a smart card, a flash memory (for example, a card, a stick, a key drive, or the like), a floppy (registered trademark) disk, a magnetic strip, and the like. The storage 1003 may be referred to as an auxiliary storage device. The above-described storage medium may be, for example, a database including the memory 1002 and/or the storage 1003, a server, or other appropriate medium.

The communication device 1004 is hardware (transmission/reception device) for performing communication between computers via a wired and/or wireless network and is also referred to as a network device, a network controller, a network card, a communication module, or the like. For example, the signal transmission unit 101 and the signal reception unit 102 of the user equipment UE and the signal transmission unit 201 and the signal reception unit 202 of the base station 10 may be realized by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. In addition, the input device 1005 and the output device 1006 may be configured to be integrated (for example, a touch panel).

In addition, the respective devices such as the processor 1001 and the memory 1002 are connected via a bus 1007 for communicating information. The bus 1007 may be configured as a single bus or may be configured as different buses between the devices.

In addition, the base station 10 and the user equipment UE may be configured to include hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 may be implemented with at least one of these hardware components.

SUMMARY

As described above, according to the embodiment, there is provided user equipment of a radio communication system that supports TTIs having a plurality of lengths and that includes a base station and the user equipment, the user equipment including an acquisition unit configured to acquire, from the base station, information indicating a plurality of UL resources which are allocated to a plurality of symbols included in a TTI having a predetermined length and with which a scheduling request can be transmitted; and a transmission unit configured to select a UL resource from the plurality of UL resources and transmit the scheduling request to the base station with the selected UL resource. According to the user equipment UE, in a radio communication system where radio frame configurations having different TTI lengths coexist, a technology capable of allocating radio resources at an appropriate timing is provided.

In addition, for requesting allocation of a UL resource with which data can be transmitted with a TTI having a shorter time length than the TTI having the predetermined length, the transmission unit may transmit the scheduling request according to a scheduling request transmission method indicating that the allocation of the UL resource with which data can be transmitted with the TTI having a shorter time length than the TTI having the predetermined length is requested. In this manner, the user equipment UE can explicitly request the base station 10 to allocate the UL resource with short TTI.

In addition, one scheduling request denotes a data size in a predetermined unit, and the transmission unit may calculate the number of one or more scheduling requests to be transmitted to the base station based on the data size in the predetermined unit and the data size of the UL data stored in the transmission buffer of the user equipment, selects the same number of the UL resources as the calculated number of the UL resources from the plurality of UL resources, and transmit the one or more scheduling requests with the respective selected UL resources. In this manner, the user equipment UE can notify the base station 10 of the data size of the data scheduled to be transmitted according to the number of SRs to be transmitted.

In addition, the acquisition unit may acquire, from the base station, scheduling information indicating UL resources divided into a plurality of areas in a time direction within the TTI having the predetermined length, wherein each of the UL resources is capable of transmitting a transport block, and the transmission unit may transmit a buffer status report as the scheduling request with the UL resource in correspondence with a UL resource corresponding to any one or the areas, among the UL resources divided into the plurality of areas. In this manner, the user equipment UE can transmit a plurality of the transport blocks within the normal TTI. In addition, since the user equipment UE can transmit the BSR through an arbitrary area within the normal TTI, it is possible to promptly request the base station 10 to allocate the UL resource.

In addition, according to an embodiment, there is provided base station of a radio communication system that supports TTIs having a plurality of lengths and that includes the base station and user equipment, the base station including a notification unit configured to notify the user equipment of information indicating a plurality of UL resources which can be allocated to a plurality of symbols within one TTI and with which a scheduling request can be transmitted; and a reception unit configured to receive the scheduling request with one or more UL resources selected from the plurality of UL resources. According to the base station 10, in a radio communication system where radio frame configurations having different TTI lengths coexist, a technique capable of allocating radio resources at an appropriate timing is provided.

In addition, according to an embodiment, there is provided a signal transmission method to be executed by user equipment of a radio communication system that supports TTIs having a plurality of lengths and that includes a base station and user equipment, the signal transmission method including acquiring, from the base station, information indicating a plurality of UL resources which are allocated to a plurality of symbols included in a TTI having a predetermined length and with which a scheduling request can be transmitted; and selecting a UL resource from the plurality of UL resources and transmit the scheduling request to the base station with the selected UL resource. According to the signal transmission method, in a radio communication system where radio frame configurations having different TTI lengths coexist, a technique capable of allocating radio resources at an appropriate timing is provided.

Supplement to Embodiments

The reference signal may be abbreviated to an RS and may be referred to as a pilot in accordance with applied standards.

Each aspect/embodiment described in the specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

In some cases, the specific operations performed by the base station the specification may be performed by upper nodes. It is apparent that, in a network configured with one or more network nodes having a base station, various operations performed for communication with a terminal may be performed by the base station and/or other network nodes other than the base station (for example, MME, S-GW, or the like is considered, but not limited thereto). In the above description, a case where there is one network node other than the base station, but a combination of a plurality of other network nodes (for example, MME and S-GW) may be used.

Information or the like may be output from the higher layer (or lower layer) to the lower layer (or higher layer). The information or the like may be input/output through a plurality of network nodes.

Input/output information or the like may be stored in a specific site (for example, a memory) or may be managed in a management table. The input/output Information or the like may be overwritten, updated, or additionally written. The output information or the like may be deleted. The input information or the like may be transmitted to another device.

The information, signals, or the like described in the specification may be represented by using any of different technologies. For example, data, instructions, commands, information, signals, bits, symbols, chips, or the like mentioned over the above description may be represented by voltages, currents, electromagnetic waves, magnetic fields or particles, optical fields or photons, or any combination thereof.

In addition, the terms described in the specification and/or terms necessary for understanding the specification may be replaced by terms having the same or similar meanings. For example, a channel and/or a symbol may be a signal. Furthermore, a signal may be a message.

The terms "traffic", "packet" and "data" as used in the specification may be used interchangeably.

In some cases, the user equipment UE may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term by the skilled in the art.

The base station 10 may be referred to as an NB (Node B), a base station, an access point, a femtocell, a small cell, or some other appropriate term by the skilled in the art.

In some cases, the terms "determining" and "deciding" used in the specification may include a wide variety of operations. The "determining" or the "deciding" may include something regarded as "determining" or "deciding" of, for example, judging, calculating, computing, processing, deriving, investigating, looking up (for example, looking up in a table, a database, or other data structures), or ascertaining. In addition, the "determining" or the "deciding" may include something regarded as "determining" or "deciding" of receiving (for example, receiving information), transmitting (for example, transmitting information), input, output, or accessing (for example, accessing data in memory). In addition, the "determining" or the "deciding" may include something regarded as "determining" or "deciding" of resolving, selecting, choosing, establishing, comparing, or the like. In other words, the "determining" or the "deciding" may include something regarded as "determining" or "deciding" of some operation.

The processing procedures (1st to 3rd thereof) described in the specification may be used alone, may be used in combination thereof, or may be used by being exchanged according to the execution. In addition, notification of predetermined information (for example, notification of "being X") is not limited to being performed explicitly, but the notification may be performed implicitly (for example, not notifying the predetermined information).

The phrase "on the basis of" used in the specification does not denote "on the basis of only" unless explicitly stated otherwise. In other words, the phrase "on the basis of" denotes both "on the basis of only" and "on the basis of at least".

Any reference to elements using notation such as "first", "second", or the like as used herein do not generally limit the amount or order of the elements. In the specification, the notation maybe used as a convenient method to distinguish two or more elements. Therefore, the reference to the first and second elements does not denote that only two elements can be used therein or that the first element needs to precede the second element in some form.

As long as the terms "include, "include ding" and variations thereof are used in the specification or claims, these terms are intended to be inclusive similarly to the term "comprising". In addition, the term "or" used in the specification or claims is intended not to be an exclusive logic OR.

The radio frame may be configured to include one frame or a plurality of frames in the time domain. In the time domain, the one frame or each of the frames may be referred to as a subframe. The subframe may be further configured to include one slot or a plurality of slots in the time domain. The slot may be further configured to include one symbol or a plurality of symbols (OFDM symbol, SC-FDMA symbol, and the like) in the time domain. The radio frame, subframe, slot, and symbol represent time units for transmitting a signal. The radio frame, the subframe, the slot, and the symbol may be differently referred to. For example, in the LTE system, the base station performs scheduling for allocating radio resources (such as a frequency bandwidth or a transmission power that can be used in each mobile station) to each mobile station. The minimum time unit of scheduling may be referred to as a TTI. For example, one subframe may be referred to as a TTI, or a plurality of consecutive subframes may be referred to as a TTI, or one slot may be referred to as a TTI. A resource block (RB) is a resource allocation unit in the time domain and the frequency domain, and the resource block may include one subcarrier or a plurality of consecutive subcarriers in the frequency domain. In addition, in the time domain of the resource block, the resource block may include one symbol or a plurality of symbols and may be one slot, one subframe, or one TTI in length. One TTI and one subframe each may be configured to include one resource block or a plurality of resource blocks. The above-described structure of the radio frame is merely an example, and the number of subframes included in the radio frame, the number of slots included in the subframe, the number of symbols and resource blocks included in the slot, and the number of subcarriers included in the resource block may be variously changed.

In the entire disclosure, for example, in a case where articles such as a, an, and the in English are added by translation, unless it is not disclosed that the articles are not applied obviously from the context, the articles are intended to include plural ones.

Although the present invention has been described above in detail, it will be apparent to the skilled in the art that the present invention is not limited to the embodiments described herein. The present invention can be implemented as changes and modifications without departing from the spirit and scope of the present invention as defined by the scope of the claims. Accordingly, the description of the specification is provided for the purpose of illustration and description and does not have any restrictive meaning with respect to the present invention.

In the embodiment, the normal TTI is an example of a TTI having a predetermined length. The short TTI is an example of a TTI having a time length shorter than a time length of a TTI having a predetermined length.

Notification of information is not limited the aspect/embodiment described in the present specification and may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Determination or decision may be made by a value (0 or 1) represented by one bit, may be made by a Boolean value (Boolean: true or false), and may be made by comparison of numerical values (comparison with a predetermined value, for example).

This patent application is based on and claims priority to Japanese Patent Application No. 2016-192359 filed on Sep. 29, 2016, and the entire content of Japanese Patent Application No. 2016-192359 is incorporated herein by reference.

LIST OF REFERENCE SYMBOLS

UE user equipment
10 base station
101 signal transmission unit
102 signal reception unit
103 acquisition unit
201 signal transmission unit
202 signal reception unit
203 scheduling unit
204 notification unit
1001 processor
1002 memory
1003 storage
1004 communication device
1005 input device
1006 output device

The invention claimed is:

1. A terminal comprising:
a receiver that receives, from a base station, configuration information including a configuration that includes an assignment, by time division multiplexing, of a plurality of scheduling request (SR) resources within one slot, the configuration information indicating a plurality of SR resource candidates, and receives information indicating a number of SR transmissions within the slot;
a processor that determines an SR resource for transmitting a SR based on the configuration information and stored one or more logical channels; and
a transmitter that transmits, to the base station, the SR with the SR resource,
wherein the receiver receives uplink scheduling control information,
wherein the uplink scheduling control information includes a priority identifier related to the one or more logical channels, and
wherein the processor determines whether uplink data on the one or more logical channels is transmitted based on the priority identifier related to the one or more logical channels.

2. The terminal according to claim 1, wherein the SR resource is configured within a frequency band for transmitting a control signal.

3. The terminal according to claim 1, wherein transmission of the SR involves transmission of a reference signal.

4. The terminal according to claim 1, wherein the processor generates a sequence based on the SR to be transmitted, and the transmitter transmits the sequence, as the SR.

5. The terminal according to claim 1,
wherein, when the determined SR resource overlaps with an uplink resource assigned by the scheduling control information, the transmitter drops transmission using the uplink resource.

6. A communication method by a terminal, the method comprising:
receiving, from a base station, configuration information including a configuration that includes an assignment, by time division multiplexing, of a plurality of scheduling request (SR) resources within one slot, the configuration information indicating a plurality of SR resource candidates;

receiving information indicating a number of SR transmissions within the slot;

determining an SR resource for transmitting a SR based on the configuration information and stored one or more logical channels; and transmitting, to the base station, the SR with the SR resource, wherein the method further comprises receiving uplink scheduling control information, wherein the uplink scheduling control information includes a priority identifier related to the one or more logical channels, and wherein the determining determines whether uplink data on the one or more logical channels is transmitted based on the priority identifier related to the one or more logical channels.

7. A radio communication system comprising:
a terminal; and
a base station,
wherein the terminal includes:
   a receiver that receives, from the base station, configuration information including a configuration that includes an assignment, by time division multiplexing, of a plurality of scheduling request (SR) resources within one slot, the configuration information indicating a plurality of SR resource candidates, and receives information indicating a number of SR transmissions within the slot;

a processor that determines an SR resource for transmitting a SR based on the configuration information and stored one or more logical channels; and a transmitter that transmits, to the base station, the SR with the SR resource, wherein the receiver receives uplink scheduling control information, wherein the uplink scheduling control information includes a priority identifier related to the one or more logical channels, and wherein the processor determines whether uplink data on the one or more logical channels is transmitted based on the priority identifier related to the one or more logical channels, and wherein the base station includes a transmitter that transmits the configuration information to the terminal.

\* \* \* \* \*